(12) United States Patent
Wynne et al.

(10) Patent No.: US 7,682,519 B2
(45) Date of Patent: Mar. 23, 2010

(54) FORMULATION FOR DUST ABATEMENT AND PREVENTION OF EROSION

(75) Inventors: James Wynne, Alexandria, VA (US); Barry Spargo, Washington, DC (US); Christopher Lloyd, Springfield, VA (US); Marc Laplante, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 888 days.

(21) Appl. No.: 11/307,919

(22) Filed: Feb. 28, 2006

(65) Prior Publication Data

US 2006/0151741 A1 Jul. 13, 2006

Related U.S. Application Data

(63) Continuation-in-part of application No. 10/778,707, filed on Feb. 12, 2004.

(60) Provisional application No. 60/471,445, filed on May 16, 2003.

(51) Int. Cl.
*C09K 3/22* (2006.01)
*G03C 11/08* (2006.01)
*C09K 21/00* (2006.01)

(52) U.S. Cl. .................. 252/88.1; 252/88.2; 252/381; 252/606

(58) Field of Classification Search ........... 252/88.1, 252/88.2, 381, 606
See application file for complete search history.

(56) References Cited

U.S. PATENT DOCUMENTS

| | | | | | |
|---|---|---|---|---|---|
| 1,910,975 | A | * | 5/1933 | Wallace | 44/602 |
| 2,436,146 | A | * | 2/1948 | Kleinicke | 252/88.1 |
| 2,443,766 | A | * | 6/1948 | Hedberg | 252/88.2 |
| 2,538,199 | A | * | 1/1951 | Jefferson et al. | 252/88.2 |
| 2,933,411 | A | * | 4/1960 | Novak | 8/142 |
| 4,055,471 | A | * | 10/1977 | Beck et al. | 201/20 |
| 4,265,963 | A | * | 5/1981 | Matalon | 442/138 |
| 4,272,414 | A | * | 6/1981 | Vandersall | 252/602 |
| 4,380,459 | A | * | 4/1983 | Netting | 95/150 |
| 4,571,116 | A | * | 2/1986 | Patil et al. | 404/76 |
| 4,582,511 | A | * | 4/1986 | Siddoway et al. | 44/577 |
| 4,610,311 | A | * | 9/1986 | Bronner et al. | 169/45 |
| 4,642,196 | A | * | 2/1987 | Yan | 299/12 |
| 4,780,233 | A | * | 10/1988 | Roe | 252/88.1 |

(Continued)

OTHER PUBLICATIONS

Office Action in U.S. Appl. No. 12/609,350.

*Primary Examiner*—Mark Eashoo
*Assistant Examiner*—Jane L Stanley
(74) *Attorney, Agent, or Firm*—John J. Karasek; Joseph T. Grunkemeyer (57) ABSTRACT

A composition of matter containing a solution made from: from about 18 to about 70 wt % of a sugar; from about 2 to about 10 wt % of a water-soluble polysaccharide; from about 0.1 to about 1 wt % of a phosphate; from about 0.01 to about 1 wt % of a surfactant; and from about 18 wt % to remainder of water. A method for dust and sand abatement and erosion prevention by: providing the above solution, applying the solution to sand or dust particles wherein the solution binds to the particles; and allowing the solution to bind to the sand or dust particles and to dry thereby forming a hardened crust.

15 Claims, 3 Drawing Sheets

U.S. PATENT DOCUMENTS

| | | | | |
|---|---|---|---|---|
| 4,960,532 A | * | 10/1990 | Kremer | 252/88.1 |
| 5,211,941 A | * | 5/1993 | Komori et al. | 424/70.12 |
| 5,223,165 A | * | 6/1993 | Winstanley et al. | 299/12 |
| 5,328,497 A | * | 7/1994 | Hazlett | 71/28 |
| 5,342,611 A | * | 8/1994 | Komori et al. | 424/70.1 |
| 5,595,782 A | * | 1/1997 | Cole | 427/212 |
| 6,086,647 A | * | 7/2000 | Rahm et al. | 44/620 |
| 6,989,113 B1 | * | 1/2006 | Mabey | 252/606 |
| 7,223,723 B2 | * | 5/2007 | Wilson | 510/366 |
| 7,445,791 B2 | * | 11/2008 | Jadhav et al. | 424/421 |
| 2003/0168625 A1 | * | 9/2003 | Sapienza et al. | 252/70 |
| 2004/0065198 A1 | * | 4/2004 | Wolff et al. | 95/154 |
| 2004/0227126 A1 | * | 11/2004 | Wynne et al. | 252/88.1 |
| 2005/0192199 A1 | * | 9/2005 | Cartwright et al. | 510/420 |

* cited by examiner

FORMULATION FOR DUST ABATEMENT AND PREVENTION OF EROSION

CROSS REFERENCE TO RELATED APPLICATIONS

This application is a continuation-in-part application claiming priority to pending U.S. patent application Ser. No. 10/778,707, filed on Feb. 12, 2004, which claims priority to U.S. Provisional Application No. 60/471,445 filed May 16, 2003, each of which are incorporated herein by reference.

FIELD OF THE INVENTION

The invention relates generally to dust abatement and, more specifically, to a crust-forming aqueous solution that aids in the abatement of dust and sand and in the prevention of wind erosion.

DESCRIPTION OF RELATED ART

Dust abatement issues have been a major concern for the U.S. military dating as far back as World War II. To date, polyacrylamide (PAM, structure shown below) is used as a soil stabilizer on roads and airfields to reduce the amount of airborne dust and sand particles. More recently, there have been several incidents involving the hard decking of military aircraft as a result of limited visibility due to dust and airborne sand brownouts. Tests have been performed utilizing PAM and were successful in a few cases; however, there are several major concerns with the application of PAM. The quantity of water required to effectively apply PAM is a concern, especially in desert environments. The well-documented carcinogenic properties associated with its residual monomer, acrylamide, which is contained within, are an even greater cause for attention. Also, the application of PAM can be a very labor-intensive operation. These concerns suggest the need for a much safer, more environmental solution that would be less of a logistical burden.

The use of PAM for reduction of irrigation-induced erosion has also increased in recent years; however, its toxicity and environmental fate in this application remains a concern. PAM is a water-soluble, high molecular weight, synthetic organic polymer that interacts with the clay found in some soils. The interaction depends upon the properties of the polymer as well as the characteristics of the soil. It is effective in stabilizing soil aggregates, reducing soil erosion, increasing water infiltration, and also has an indirect positive impact upon crop growth and yield. In general, PAM degradation occurs through physical breakdown. PAM itself has been shown to be non-toxic to animals, fish and plants; however, the toxicity of its residual monomer (acrylamide) is a known neurotoxin to humans. The major source of acrylamide that is released into the environment is from the use of polyacrylamide products. As a result of such use, FDA regulates the content of PAM and its residual monomer present in food products. See C. A. Seybold, Communications in Soil Science and Plant Analysis 1994, 25, 2171-2185 and D. J. King, R. R. Noss, Reviews on Environmental Health 1989, 8, 3-16, both of which are incorporated herein by reference.

PAM has been shown to be very effective in controlling water erosion from furrow irrigation. Laboratory and field wind tunnel tests using several formulations and rates of PAM were reported to determine its possible use for forming wind erosion-resistant surfaces (crusts). These tests showed that PAM was no more effective than natural rainfall for wind erosion control within general agricultural conditions. See D. V. Armburst, Journal of Soil and Water Conservation 1999, 54, 557-559, incorporated herein by reference.

Research has also been performed to optimize the binding ability of PAM to various types of clay minerals. It was determined that the efficacy of cationic and anionic PAM increased effectiveness of dispersed clays; however, the non-neutral pH materials pose additional environmental and health concerns. See D. A. Laird, Soil Science 1997, 162, 826-832, incorporated herein by reference.

Use of PAM for the reduction of pesticide contamination through runoff from agricultural fields and wind erosion-resistant surfaces has also been studied. The formation of the crust has been reported to retain moisture in the sand/soil and prevent rapid evaporation in arid conditions. See G. Singh, J. Letey, P. Hanson, P. Osterli, & W. F. Spencer, Journal of Environmental Science Health Part B 1996, 31, 25-41, incorporated herein by reference.

The application of PAM in landing zone environments is a multi-step process. The procedure generally starts by an initial application of water followed by an application of a select sorbent. The sorbent is then mixed into the soil/sand by agitation. Typically, this technique employs such instruments as a garden hoe or a leaf rake. After mixing, an additional application of water is made followed by treatment with polyacrylamide, which is typically applied in the form of a high molecular weight solid ground polymer. Due to the toxicity of residual monomer present in the PAM polymer mixture, special personal protective equipment must be utilized by those handling the material in fine powder form. Also, aired conditions promote sublimation of residual monomer, which again poses a health concern to the end users. This is yet again manually mixed into the soil, and a final application of water is made to complete the process.

The use of sugar has been noted in multiple commercial applications; however, there are few reports that are relevant. Patents for formulations involving sugar have been utilized to prevent fertilizer granule caking (see, e.g., U.S. Pat. No. 5,328,497 to Hazlett, which is incorporated herein by reference) and to reduce dust formation from detergent tablets (see, e.g., U.S. Pat. No. 6,376,454 to Eggersmann et al., which is incorporated herein by reference). In addition, a polysaccharide comprising of at least nine monosaccharide units suspended in an oil base with thickeners and emulsifiers has been used for dust suppression (see, e.g., U.S. Pat. No. 5,595,782 to Cole, which is incorporated herein by reference).

Other products such as emulsions of polyvinyl acetate and esters of polyvinyl alcohols have been reported to effectively promote surface consolidation of soil and cements. See J. M. Geist, S. V. Amagna, B. B. Mellor, Industrial and Engineering Chemistry 1953, 45, 759-767 and U.S. Pat. No. 6,122,860 to Von Tapavicza et al., both of which are incorporated herein by reference. To a lesser degree various foaming agents functioning as elastomeric insoluble polymers have also been utilized in dust suppression (see, e.g., U.S. Pat. No. 4,551,261 to Salihar, which is incorporated herein by reference). Partly olefinically unsaturated fatty acids of triglycerides as biodegradable plasticizers in dispersions have been utilized for surface stabilization of sand and soil (see, e.g., U.S. Pat. No. 5,846,601 to Ritter et al., which is incorporated herein by reference). Various compositions consisting of primarily lignin sulfonate have been demonstrated to stabilize soil formations from the effects of water (see, e.g., U.S. Pat. No. 4,394,213 to Ferm, which is incorporated herein by reference).

With the aforementioned documented problems and limited scope, there is clearly a need for an aqueous formulation that is environmentally friendly and can be easily applied in a single step for the purpose of dust abatement and prevention of wind erosion.

BRIEF SUMMARY OF THE INVENTION

The invention comprises a composition of matter comprising a solution made from: from about 18 to about 70 wt % of a sugar; from about 2 to about 10 wt % of a water-soluble polysaccharide; from about 0.1 to about 1 wt % of a phosphate; from about 0.01 to about 1 wt % of a surfactant; and from about 18 wt % to remainder of water.

The invention further comprises a method comprising: providing the above solution, applying the solution to sand or dust particles wherein the solution binds to the particles; and allowing the solution to bind to the sand or dust particles and to dry thereby forming a hardened crust

BRIEF DESCRIPTION OF THE DRAWINGS

A more complete appreciation of the invention will be readily obtained by reference to the following Detailed Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The aforementioned problems of the current technology may be overcome by the present invention wherein a safe, biodegradable, environmentally-benign, non-toxic, water-soluble solution can be applied to dust and sand to bind the particles forming a hardened crust top layer. The solution consists of a mixture of water, sugar, water-soluble polysaccharide, phosphate, and surfactant. Once applied, the wetted layer dries to form a wind erosion-resistant surface (crust). Upon formation of the hardened crust and times prior thereto, binding occurs insomuch as to be effective immediately upon application. Heat and windy conditions promote the effectiveness of this product.

The present invention can have several advantages over existing technology and current techniques, including the following: it is environmentally friendly; it is a simple, one-step application; it is non-toxic, non-flammable, and biodegradable; it is cost effective; it requires less water than other dust palliatives; it has increased binding strength over PAM and other products; it is easy to prepare and apply; desert conditions increase its effectiveness; it is immediately effective upon application; it is effective on a variety of particle sizes ranging from less than 1 µm to greater than 500 µm; it is effective on a variety of types of dusts and sands, including silicas, clays and carbonates; it has increased shelf-life; it will not harden nor degrade in solution form upon storage; it withstands generated wind shear up to 50 psf; and it can prevent the spread of bacteria by immobilizing them.

In some embodiments, the ranges of the ingredients are as follows: from about 30 to about 70 wt % of a sugar, from about 2 to about 10 wt % of a water-soluble polysaccharide, from about 0.1 to about 1 wt % of a phosphate, from about 0.01 to about 1 wt % of a surfactant, and from about 18 wt % to remainder of water; from about 65 to about 70 wt % of a sugar, from about 9 to about 10 wt % of a water-soluble polysaccharide, from about 0.9 to about 1 wt % of a phosphate, from about 0.9 to about 1 wt % of a surfactant and from about 18 wt % to remainder of water; and from about 18 to about 46 wt % of a sugar, from about 2 to about 4 wt % of a water-soluble polysaccharide, from about 0.1 to about 1 wt % of a phosphate, from about 0.01 to about 1 wt % of a surfactant, and from about 48 wt % to remainder of water. The last formulation may be made by dilution of a concentrate with water.

The composition may be applied either in neat (concentrated) form or after dilution with water. The concentrated form may be useful in high traffic areas, such as a dirt road. The diluted form may be useful where there would be no other traffic, such as a desert landing site.

The sugar and the water are primary active ingredients within the solution. The concentrations of these components within the mixture may be varied while maintaining effectiveness of the solution, within the ranges listed herein. Additionally, a small amount (<1%) of a biocide, fungicide, or combination of biocide and fungicide may be added to enhance storage stability. The application of the described solution may be effective at temperature ranges from 0 to 150° F.

The sugar can be in a solid form or a liquid form (e.g., syrup or corn syrup). Several alternatives in part or in whole, may be substitutes for the sugar (sucrose) in the mixture. Any form of a monosaccharide (e.g. glucose, fructose) or disaccharide (e.g. maltose) may be substituted for the sugar in the solution while obtaining similar binding effects.

Any form of a water-soluble polysaccharide (e.g. cellulose) may be used, including, but not limited to, starch and guar gum, without decrease in the effectiveness of the solution.

Suitable surfactants include, but are not limited to, soaps, any quaternary ammonium salt, and any mixture thereof.

Suitable phosphates include, but are not limited to, trisodium phosphate and phosphate-containing detergents. This additive may function as a mordant and may be substituted for other similar compounds, such as automatic detergent, laboratory glassware detergent, carbonates, phosphates, or other sulfates.

The amount of water can be the maximum possible to make a total of 100 wt % of sugar, polysaccharide, phosphate, surfactant, and water. If other ingredients are present, the amount of water can be less than the maximum possible, including, but not limited to, 1, 2, 3, 4, 5, 10, 15, 20, and 25 wt % points less than the maximum.

Studies involving varying the concentrations of each of the components within the solution were performed to examine effectiveness. Solutions were applied to sand of various compositions and particle sizes. Particle sizes ranged from <1 µm to >500 µm. Sand compositions consisted of carbonate, silica, clay, mixes and others. Application was made using hand held bottle sprayers, garden sprayers, hydro-seeders, an agricultural sprayer, commercial and military automated pump sprayers, fire trucks, and combinations thereof. The composition may be diluted with water before applying the composition to the sand or dust. The sand was allowed to dry in ambient conditions with times ranging from 1 second to 48 hours. Hardening of surface was increased with prolonged drying times, increased temperature, decreased humidity, or combinations thereof.

For purposes of reducing occurrences involving helicopter hard decking due to brownouts, tests were performed in ambient outdoor conditions using a high-velocity wind-generating fan. Three feet by three feet areas of sand were prepared and the described solution was applied. Various surfaces were examined to include groomed and rough terrain and hills. Upon complete drying and hardening, top crusts were formed with varying thickness depending upon volume of solution applied. The solution may be applied in volumes ranging from 1 mL to 20 liters per square foot. The wind generator was placed directly over the sand. The generated wind speed was varied from speeds of 5,000 rpm to 15,000 rpm. Heavy-lift military helicopters are known to produce downwind forces equivalent to 7,500 rpm upon landing and take-off.

EXAMPLES

Fine sand was taken from Palm Desert, Calif. The solution composition was 70% sucrose, 5% starch, 1% TSP, 1% surfactant, and remainder water, and subsequently diluted using tap water. To make a batch of samples, a stainless-steel mold with six cylindrical cavities (38 mm diameter, 38 mm height) was lined with Mylar inserts for easy removal of the samples. Compression tests were performed with a Universal Electromechanical Testing System (Instron) equipped with the 5500 Series Control Electronics Package, a 50 kN load cell, and a "tilting base" to accommodate unparallel sample surfaces. Equipment operation and data acquisition were achieved with the Bluehill 2 testing software.

The sand was heated at 150° C. to remove any moisture. Solution dilutions were prepared by adding various amounts of water to the pure sand abatement solution. A fixed volume (10 mL) of diluted solution was measured and added to 52 g of sand. The ingredients were thoroughly mixed with a stick and poured into one of the mold cavities. The mixture was compressed manually with a stainless steel cylinder, producing a sample approximately 33 mm in height. Five replicates were prepared in the remaining cavities. The filled mold was placed on its side in a vented oven at 60° C. and left to dry overnight.

Once the samples were removed from the oven, they were allowed to cool and acclimate to environmental conditions, i.e. reabsorb some of the moisture from the ambient air, for a variable number of days, to evaluate the effects on the sample properties. Following that period, the sample was weighed to estimate the amount of evaporated water.

Figure 1:
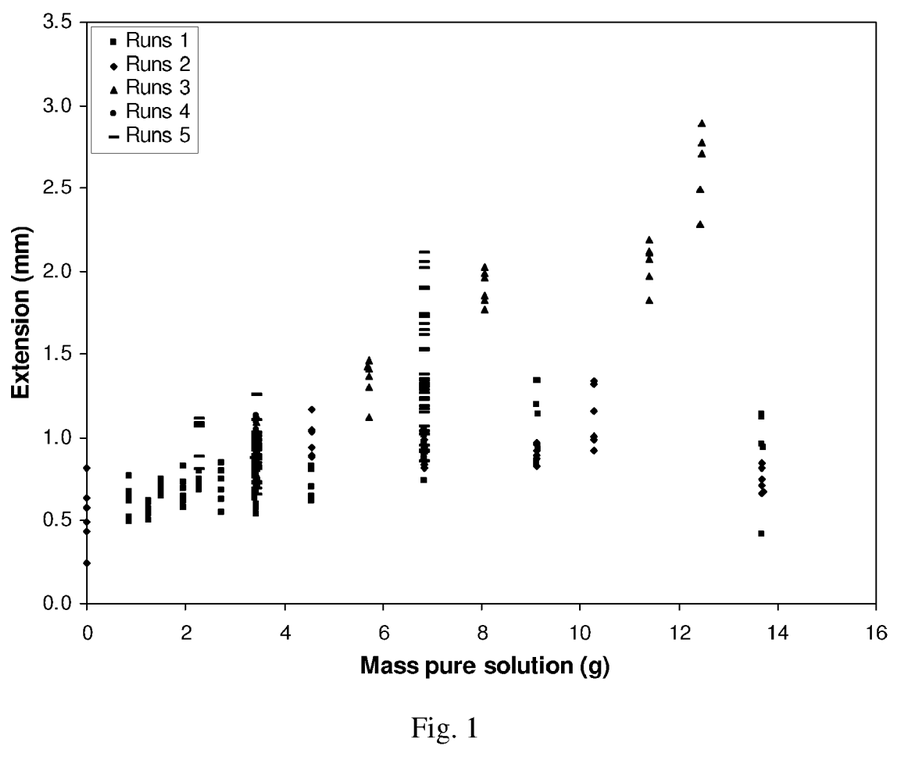
FIGS. 1, 2, and 3 show plots of extension, failure load, and stress, respectively, as a function of mass pure solution.
Figure 2:
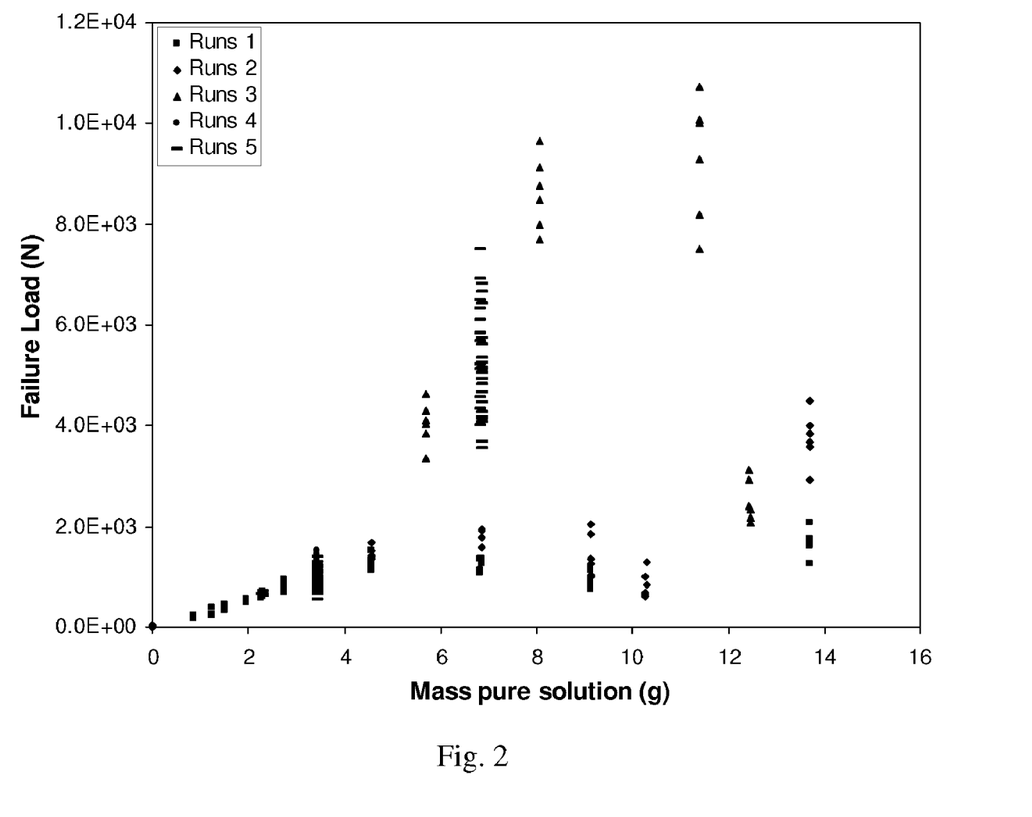
Figure 3:
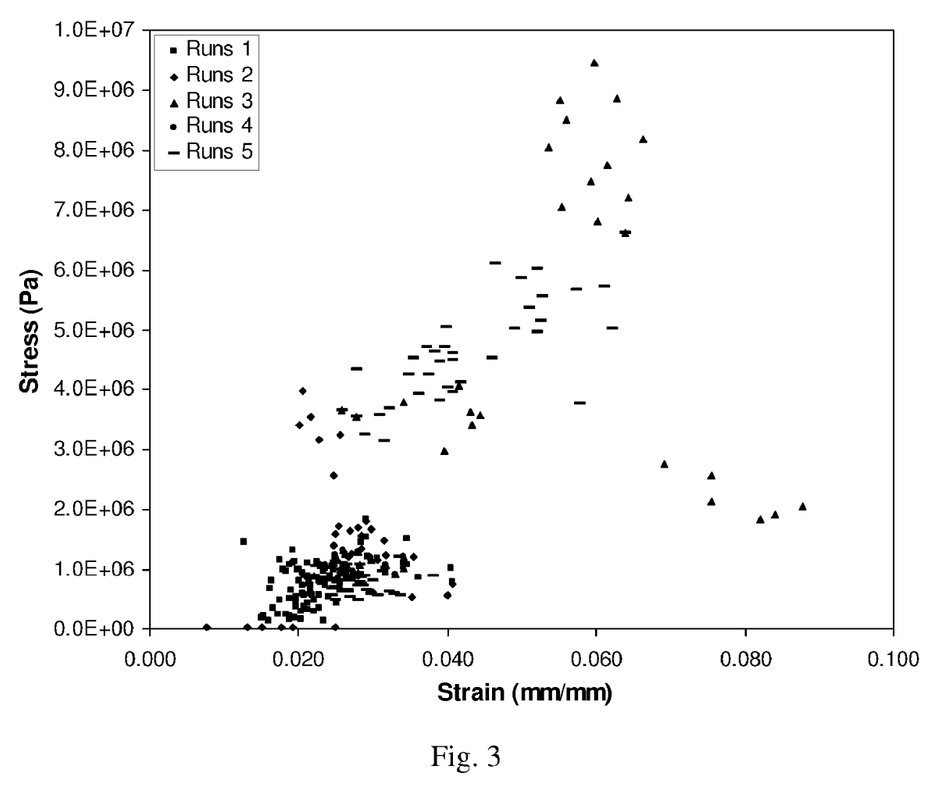

The sample was then placed vertically in the Universal Electromechanical Testing System. The load cell, located above the sample, was lowered until contact was made with the sample. In cases where the two sample surfaces were not perfectly parallel, the "tilting base" was adjusted as needed so the top of the sample was on the same plane as the load cell. Compression tests at constant compression rate (0.5 mm/s) were conducted to failure, and the data were collected using the associated software. The failure point was established as the maximum load supported by the sample. The equipment was stopped when the load reached 50% of its peak value, to ensure the peak was a global maximum. The table below and FIGS. 1-3 summarize the results.

| Parts Water parts | Parts Solution parts | Mass pure solution g | Mass total solids g | Time sec | Extension mm | Load N | Strain mm/mm | Stress Pa |
|---|---|---|---|---|---|---|---|---|
| 0 | 1 | 13.70 | 9.53 | 135.2 | 1.13 | 1270 | 0.034 | 1.12E+06 |
| 0 | 1 | 13.70 | 9.53 | 50.4 | 0.42 | 1646 | 0.013 | 1.45E+06 |
| 0 | 1 | 13.69 | 9.53 | 136.9 | 1.14 | 1730 | 0.035 | 1.53E+06 |
| 0 | 1 | 13.69 | 9.53 | 115.3 | 0.96 | 2093 | 0.029 | 1.85E+06 |
| 0 | 1 | 13.71 | 9.54 | 112.9 | 0.94 | 1666 | 0.029 | 1.47E+06 |
| 0 | 1 | 13.70 | 9.53 | 115.3 | 0.96 | 1754 | 0.029 | 1.55E+06 |
| 0 | 1 | 13.71 | 9.54 | 81.4 | 0.68 | 4515 | 0.021 | 3.98E+06 |
| 0 | 1 | 13.70 | 9.53 | 90.1 | 0.75 | 3596 | 0.023 | 3.17E+06 |
| 0 | 1 | 13.70 | 9.53 | 101.7 | 0.85 | 3697 | 0.026 | 3.26E+06 |
| 0 | 1 | 13.69 | 9.53 | 85.7 | 0.71 | 4016 | 0.022 | 3.54E+06 |
| 0 | 1 | 13.70 | 9.53 | 79.7 | 0.66 | 3862 | 0.020 | 3.41E+06 |
| 0 | 1 | 13.69 | 9.53 | 98.0 | 0.82 | 2928 | 0.025 | 2.58E+06 |
| 1 | 10 | 12.44 | 8.66 | 299.2 | 2.49 | 2417 | 0.076 | 2.13E+06 |
| 1 | 10 | 12.44 | 8.66 | 299.1 | 2.49 | 2931 | 0.076 | 2.58E+06 |
| 1 | 10 | 12.44 | 8.66 | 273.7 | 2.28 | 3120 | 0.069 | 2.75E+06 |
| 1 | 10 | 12.45 | 8.66 | 347.4 | 2.90 | 2350 | 0.088 | 2.07E+06 |
| 1 | 10 | 12.46 | 8.67 | 333.1 | 2.78 | 2196 | 0.084 | 1.94E+06 |
| 1 | 10 | 12.46 | 8.67 | 324.7 | 2.71 | 2078 | 0.082 | 1.83E+06 |
| 1 | 5 | 11.41 | 7.94 | 127.2 | 2.12 | 8175 | 0.064 | 7.21E+06 |
| 1 | 5 | 11.41 | 7.94 | 126.6 | 2.11 | 7508 | 0.064 | 6.62E+06 |
| 1 | 5 | 11.41 | 7.94 | 109.4 | 1.82 | 10008 | 0.055 | 8.82E+06 |
| 1 | 5 | 11.41 | 7.94 | 124.4 | 2.07 | 10064 | 0.063 | 8.87E+06 |
| 1 | 5 | 11.41 | 7.94 | 118.2 | 1.97 | 10715 | 0.060 | 9.45E+06 |
| 1 | 5 | 11.41 | 7.94 | 131.2 | 2.19 | 9285 | 0.066 | 8.19E+06 |
| 1 | 3 | 10.29 | 7.16 | 161.3 | 1.34 | 848 | 0.041 | 7.48E+05 |
| 1 | 3 | 10.28 | 7.15 | 110.8 | 0.92 | 1010 | 0.028 | 8.90E+05 |
| 1 | 3 | 10.29 | 7.16 | 121.1 | 1.01 | 1320 | 0.031 | 1.16E+06 |
| 1 | 3 | 10.27 | 7.15 | 139.8 | 1.17 | 621 | 0.035 | 5.47E+05 |
| 1 | 3 | 10.27 | 7.15 | 119.1 | 0.99 | 700 | 0.030 | 6.18E+05 |
| 1 | 3 | 10.27 | 7.15 | 158.8 | 1.32 | 654 | 0.040 | 5.77E+05 |
| 1 | 2 | 9.14 | 6.36 | 160.5 | 1.34 | 1155 | 0.041 | 1.02E+06 |
| 1 | 2 | 9.14 | 6.36 | 137.1 | 1.14 | 1218 | 0.035 | 1.07E+06 |

-continued

| Parts Water parts | Parts Solution parts | Mass pure solution g | Mass total solids g | Properties at maximum compressive load | | | | |
|---|---|---|---|---|---|---|---|---|
| | | | | Time sec | Extension mm | Load N | Strain mm/mm | Stress Pa |
| 1 | 2 | 9.14 | 6.36 | 112.1 | 0.93 | 1184 | 0.028 | 1.04E+06 |
| 1 | 2 | 9.14 | 6.36 | 101.0 | 0.84 | 744 | 0.026 | 6.56E+05 |
| 1 | 2 | 9.13 | 6.35 | 161.1 | 1.34 | 887 | 0.041 | 7.82E+05 |
| 1 | 2 | 9.14 | 6.36 | 143.3 | 1.19 | 981 | 0.036 | 8.65E+05 |
| 1 | 2 | 9.14 | 6.36 | 106.8 | 0.89 | 1866 | 0.027 | 1.65E+06 |
| 1 | 2 | 9.13 | 6.35 | 114.9 | 0.96 | 2054 | 0.029 | 1.81E+06 |
| 1 | 2 | 9.14 | 6.36 | 116.9 | 0.97 | 1374 | 0.030 | 1.21E+06 |
| 1 | 2 | 9.14 | 6.36 | 104.8 | 0.87 | 1002 | 0.026 | 8.84E+05 |
| 1 | 2 | 9.14 | 6.36 | 98.9 | 0.82 | 1279 | 0.025 | 1.13E+06 |
| 1 | 2 | 9.14 | 6.36 | 111.1 | 0.93 | 1058 | 0.028 | 9.33E+05 |
| 0.7 | 1 | 8.07 | 5.61 | 109.8 | 1.83 | 7991 | 0.055 | 7.05E+06 |
| 0.7 | 1 | 8.05 | 5.60 | 119.1 | 1.99 | 7712 | 0.060 | 6.80E+06 |
| 0.7 | 1 | 8.06 | 5.61 | 121.8 | 2.03 | 8781 | 0.062 | 7.74E+06 |
| 0.7 | 1 | 8.07 | 5.61 | 111.0 | 1.85 | 9657 | 0.056 | 8.51E+06 |
| 0.7 | 1 | 8.06 | 5.61 | 106.2 | 1.77 | 9123 | 0.054 | 8.04E+06 |
| 0.7 | 1 | 8.06 | 5.61 | 117.3 | 1.96 | 8488 | 0.059 | 7.48E+06 |
| 1 | 1 | 6.85 | 4.77 | 89.3 | 0.74 | 1278 | 0.023 | 1.13E+06 |
| 1 | 1 | 6.84 | 4.76 | 104.6 | 0.87 | 1140 | 0.026 | 1.01E+06 |
| 1 | 1 | 6.85 | 4.77 | 121.7 | 1.01 | 1361 | 0.031 | 1.20E+06 |
| 1 | 1 | 6.84 | 4.76 | 116.5 | 0.97 | 1380 | 0.029 | 1.22E+06 |
| 1 | 1 | 6.84 | 4.76 | 126.0 | 1.05 | 1088 | 0.032 | 9.59E+05 |
| 1 | 1 | 6.84 | 4.76 | 125.1 | 1.04 | 1139 | 0.032 | 1.00E+06 |
| 1 | 1 | 6.85 | 4.77 | 98.7 | 0.82 | 1808 | 0.025 | 1.59E+06 |
| 1 | 1 | 6.85 | 4.77 | 112.9 | 0.94 | 1791 | 0.029 | 1.58E+06 |
| 1 | 1 | 6.85 | 4.77 | 100.3 | 0.84 | 1952 | 0.025 | 1.72E+06 |
| 1 | 1 | 6.85 | 4.77 | 98.1 | 0.82 | 1613 | 0.025 | 1.42E+06 |
| 1 | 1 | 6.85 | 4.77 | 110.5 | 0.92 | 1942 | 0.028 | 1.71E+06 |
| 1 | 1 | 6.86 | 4.77 | 118.2 | 0.99 | 1914 | 0.030 | 1.69E+06 |
| 1 | 1 | 6.84 | 4.76 | 110.3 | 0.92 | 4025 | 0.028 | 3.55E+06 |
| 1 | 1 | 6.85 | 4.77 | 102.5 | 0.85 | 4143 | 0.026 | 3.65E+06 |
| 1 | 1 | 6.86 | 4.77 | 124.7 | 1.04 | 3557 | 0.031 | 3.14E+06 |
| 1 | 1 | 6.85 | 4.77 | 127.3 | 1.06 | 4167 | 0.032 | 3.67E+06 |
| 1 | 1 | 6.86 | 4.77 | 156.5 | 1.30 | 5343 | 0.040 | 4.71E+06 |
| 1 | 1 | 6.85 | 4.77 | 114.4 | 0.95 | 3679 | 0.029 | 3.24E+06 |
| 1 | 1 | 6.85 | 4.77 | 143.2 | 1.19 | 4456 | 0.036 | 3.93E+06 |
| 1 | 1 | 6.86 | 4.77 | 148.5 | 1.24 | 4835 | 0.038 | 4.26E+06 |
| 1 | 1 | 6.85 | 4.77 | 147.2 | 1.23 | 5360 | 0.037 | 4.73E+06 |
| 1 | 1 | 6.86 | 4.77 | 228.8 | 1.91 | 4284 | 0.058 | 3.78E+06 |
| 1 | 1 | 6.84 | 4.76 | 160.9 | 1.34 | 5112 | 0.041 | 4.51E+06 |
| 1 | 1 | 6.85 | 4.77 | 165.3 | 1.38 | 4659 | 0.042 | 4.11E+06 |
| 1 | 1 | 6.84 | 4.76 | 207.6 | 1.73 | 5853 | 0.052 | 5.16E+06 |
| 1 | 1 | 6.85 | 4.77 | 226.7 | 1.89 | 6412 | 0.057 | 5.65E+06 |
| 1 | 1 | 6.85 | 4.77 | 197.4 | 1.65 | 6649 | 0.050 | 5.86E+06 |
| 1 | 1 | 6.84 | 4.76 | 183.9 | 1.53 | 6908 | 0.046 | 6.09E+06 |
| 1 | 1 | 6.85 | 4.77 | 206.4 | 1.72 | 6812 | 0.052 | 6.01E+06 |
| 1 | 1 | 6.84 | 4.76 | 253.1 | 2.11 | 7502 | 0.064 | 6.61E+06 |
| 1 | 1 | 6.84 | 4.76 | 208.5 | 1.74 | 6313 | 0.053 | 5.57E+06 |
| 1 | 1 | 6.85 | 4.77 | 206.2 | 1.72 | 5624 | 0.052 | 4.96E+06 |
| 1 | 1 | 6.84 | 4.76 | 194.4 | 1.62 | 5672 | 0.049 | 5.00E+06 |
| 1 | 1 | 6.84 | 4.76 | 242.1 | 2.02 | 6474 | 0.061 | 5.71E+06 |
| 1 | 1 | 6.84 | 4.76 | 202.1 | 1.68 | 6087 | 0.051 | 5.37E+06 |
| 1 | 1 | 6.84 | 4.76 | 246.1 | 2.05 | 5677 | 0.062 | 5.01E+06 |
| 1 | 1 | 6.85 | 4.77 | 182.1 | 1.52 | 5146 | 0.046 | 4.54E+06 |
| 1 | 1 | 6.85 | 4.77 | 140.5 | 1.17 | 5136 | 0.035 | 4.53E+06 |
| 1 | 1 | 6.85 | 4.77 | 110.0 | 0.92 | 4916 | 0.028 | 4.33E+06 |
| 1 | 1 | 6.86 | 4.77 | 151.5 | 1.26 | 5247 | 0.038 | 4.63E+06 |
| 1 | 1 | 6.85 | 4.77 | 161.1 | 1.34 | 4474 | 0.041 | 3.94E+06 |
| 1 | 1 | 6.85 | 4.77 | 157.5 | 1.31 | 5726 | 0.040 | 5.05E+06 |
| 1 | 1 | 6.86 | 4.77 | 137.9 | 1.15 | 4832 | 0.035 | 4.26E+06 |
| 1 | 1 | 6.84 | 4.76 | 154.6 | 1.29 | 4332 | 0.039 | 3.82E+06 |
| 1 | 1 | 6.86 | 4.77 | 122.0 | 1.02 | 4064 | 0.031 | 3.58E+06 |
| 1 | 1 | 6.84 | 4.76 | 161.5 | 1.35 | 5233 | 0.041 | 4.61E+06 |
| 1 | 1 | 6.86 | 4.77 | 154.1 | 1.28 | 5065 | 0.039 | 4.47E+06 |
| 1 | 1 | 6.84 | 4.76 | 158.9 | 1.32 | 4570 | 0.040 | 4.03E+06 |
| 1.4 | 1 | 5.71 | 3.97 | 88.0 | 1.47 | 4046 | 0.044 | 3.57E+06 |
| 1.4 | 1 | 5.71 | 3.97 | 67.4 | 1.12 | 4315 | 0.034 | 3.80E+06 |
| 1.4 | 1 | 5.71 | 3.97 | 82.3 | 1.37 | 4621 | 0.042 | 4.07E+06 |
| 1.4 | 1 | 5.70 | 3.97 | 85.6 | 1.43 | 3862 | 0.043 | 3.41E+06 |
| 1.4 | 1 | 5.71 | 3.97 | 78.4 | 1.31 | 3367 | 0.040 | 2.97E+06 |
| 1.4 | 1 | 5.71 | 3.97 | 85.2 | 1.42 | 4122 | 0.043 | 3.63E+06 |
| 2 | 1 | 4.57 | 3.18 | 76.4 | 0.64 | 1519 | 0.019 | 1.34E+06 |
| 2 | 1 | 4.56 | 3.17 | 74.7 | 0.62 | 1226 | 0.019 | 1.08E+06 |
| 2 | 1 | 4.57 | 3.18 | 77.3 | 0.64 | 1286 | 0.020 | 1.13E+06 |
| 2 | 1 | 4.57 | 3.18 | 84.4 | 0.70 | 1266 | 0.021 | 1.12E+06 |

-continued

| Parts Water parts | Parts Solution parts | Mass pure solution g | Mass total solids g | Properties at maximum compressive load | | | | |
|---|---|---|---|---|---|---|---|---|
| | | | | Time sec | Extension mm | Load N | Strain mm/mm | Stress Pa |
| 2 | 1 | 4.56 | 3.17 | 97.5 | 0.81 | 1146 | 0.025 | 1.01E+06 |
| 2 | 1 | 4.57 | 3.18 | 98.8 | 0.82 | 1344 | 0.025 | 1.19E+06 |
| 2 | 1 | 4.57 | 3.18 | 105.8 | 0.88 | 1368 | 0.027 | 1.21E+06 |
| 2 | 1 | 4.57 | 3.18 | 112.5 | 0.94 | 1539 | 0.028 | 1.36E+06 |
| 2 | 1 | 4.57 | 3.18 | 107.1 | 0.89 | 1440 | 0.027 | 1.27E+06 |
| 2 | 1 | 4.57 | 3.18 | 140.4 | 1.17 | 1380 | 0.035 | 1.22E+06 |
| 2 | 1 | 4.56 | 3.17 | 124.5 | 1.04 | 1680 | 0.031 | 1.48E+06 |
| 2 | 1 | 4.57 | 3.18 | 125.5 | 1.05 | 1413 | 0.032 | 1.25E+06 |
| 3 | 1 | 3.45 | 2.40 | 84.4 | 0.70 | 1007 | 0.021 | 8.88E+05 |
| 3 | 1 | 3.44 | 2.40 | 71.1 | 0.59 | 1139 | 0.018 | 1.00E+06 |
| 3 | 1 | 3.43 | 2.39 | 72.4 | 0.60 | 1099 | 0.018 | 9.69E+05 |
| 3 | 1 | 3.42 | 2.38 | 81.3 | 0.68 | 1075 | 0.021 | 9.48E+05 |
| 3 | 1 | 3.43 | 2.38 | 84.8 | 0.71 | 931 | 0.021 | 8.21E+05 |
| 3 | 1 | 3.43 | 2.39 | 80.1 | 0.67 | 916 | 0.020 | 8.08E+05 |
| 3 | 1 | 3.42 | 2.38 | 96.7 | 0.81 | 1187 | 0.024 | 1.05E+06 |
| 3 | 1 | 3.42 | 2.38 | 83.7 | −0.32 | 1031 | −0.010 | 9.09E+05 |
| 3 | 1 | 3.42 | 2.38 | 76.5 | 0.64 | 1247 | 0.019 | 1.10E+06 |
| 3 | 1 | 3.43 | 2.39 | 79.4 | 0.66 | 1149 | 0.020 | 1.01E+06 |
| 3 | 1 | 3.43 | 2.39 | 69.7 | 0.58 | 1319 | 0.018 | 1.16E+06 |
| 3 | 1 | 3.42 | 2.38 | 99.0 | 0.83 | 929 | 0.025 | 8.19E+05 |
| 3 | 1 | 3.42 | 2.38 | 78.9 | 0.66 | 1143 | 0.020 | 1.01E+06 |
| 3 | 1 | 3.42 | 2.38 | 95.8 | 0.80 | 1007 | 0.024 | 8.88E+05 |
| 3 | 1 | 3.42 | 2.38 | 90.8 | 0.76 | 901 | 0.023 | 7.95E+05 |
| 3 | 1 | 3.42 | 2.38 | 85.1 | 0.71 | 856 | 0.021 | 7.55E+05 |
| 3 | 1 | 3.43 | 2.39 | 65.4 | 0.55 | 924 | 0.017 | 8.15E+05 |
| 3 | 1 | 3.43 | 2.38 | 102.5 | 0.85 | 1038 | 0.026 | 9.15E+05 |
| 3 | 1 | 3.42 | 2.38 | 92.9 | 0.77 | 1093 | 0.023 | 9.64E+05 |
| 3 | 1 | 3.42 | 2.38 | 81.0 | 0.68 | 825 | 0.020 | 7.28E+05 |
| 3 | 1 | 3.43 | 2.39 | 92.9 | 0.77 | 944 | 0.023 | 8.32E+05 |
| 3 | 1 | 3.42 | 2.38 | 93.8 | 0.78 | 830 | 0.024 | 7.32E+05 |
| 3 | 1 | 3.42 | 2.38 | 85.7 | 0.71 | 816 | 0.022 | 7.20E+05 |
| 3 | 1 | 3.43 | 2.39 | 84.4 | 0.70 | 968 | 0.021 | 8.54E+05 |
| 3 | 1 | 3.43 | 2.38 | 111.3 | 0.93 | 1472 | 0.028 | 1.30E+06 |
| 3 | 1 | 3.43 | 2.38 | 98.3 | 0.82 | 1253 | 0.025 | 1.11E+06 |
| 3 | 1 | 3.43 | 2.38 | 103.9 | 0.87 | 1432 | 0.026 | 1.26E+06 |
| 3 | 1 | 3.43 | 2.38 | 135.5 | 1.13 | 1376 | 0.034 | 1.21E+06 |
| 3 | 1 | 3.42 | 2.38 | 102.9 | 0.86 | 1517 | 0.026 | 1.34E+06 |
| 3 | 1 | 3.43 | 2.38 | 117.6 | 0.98 | 1326 | 0.030 | 1.17E+06 |
| 3 | 1 | 3.42 | 2.38 | 92.3 | 0.77 | 1188 | 0.023 | 1.05E+06 |
| 3 | 1 | 3.43 | 2.38 | 107.0 | 0.89 | 973 | 0.027 | 8.58E+05 |
| 3 | 1 | 3.43 | 2.39 | 99.0 | 0.83 | 1424 | 0.025 | 1.26E+06 |
| 3 | 1 | 3.43 | 2.39 | 105.0 | 0.88 | 1051 | 0.027 | 9.27E+05 |
| 3 | 1 | 3.43 | 2.38 | 93.9 | 0.78 | 1224 | 0.024 | 1.08E+06 |
| 3 | 1 | 3.43 | 2.38 | 131.2 | 1.09 | 1043 | 0.033 | 9.19E+05 |
| 3 | 1 | 3.42 | 2.38 | 91.4 | 0.76 | 1242 | 0.023 | 1.10E+06 |
| 3 | 1 | 3.42 | 2.38 | 103.4 | 0.86 | 1239 | 0.026 | 1.09E+06 |
| 3 | 1 | 3.42 | 2.38 | 125.2 | 1.04 | 1236 | 0.032 | 1.09E+06 |
| 3 | 1 | 3.42 | 2.38 | 100.2 | 0.84 | 997 | 0.025 | 8.79E+05 |
| 3 | 1 | 3.43 | 2.38 | 107.9 | 0.90 | 1117 | 0.027 | 9.85E+05 |
| 3 | 1 | 3.43 | 2.39 | 135.1 | 1.13 | 1162 | 0.034 | 1.02E+06 |
| 3 | 1 | 3.43 | 2.38 | 87.3 | 0.73 | 1027 | 0.022 | 9.05E+05 |
| 3 | 1 | 3.42 | 2.38 | 105.5 | 0.88 | 989 | 0.027 | 8.72E+05 |
| 3 | 1 | 3.42 | 2.38 | 111.3 | 0.93 | 1086 | 0.028 | 9.57E+05 |
| 3 | 1 | 3.43 | 2.38 | 111.4 | 0.93 | 1238 | 0.028 | 1.09E+06 |
| 3 | 1 | 3.42 | 2.38 | 104.8 | 0.87 | 1221 | 0.026 | 1.08E+06 |
| 3 | 1 | 3.42 | 2.38 | 101.4 | 0.85 | 1131 | 0.026 | 9.97E+05 |
| 3 | 1 | 3.42 | 2.38 | 99.0 | 0.83 | 1305 | 0.025 | 1.15E+06 |
| 3 | 1 | 3.42 | 2.38 | 114.2 | 0.95 | 1012 | 0.029 | 8.93E+05 |
| 3 | 1 | 3.43 | 2.38 | 106.6 | 0.89 | 966 | 0.027 | 8.52E+05 |
| 3 | 1 | 3.43 | 2.38 | 96.8 | 0.81 | 768 | 0.024 | 6.77E+05 |
| 3 | 1 | 3.43 | 2.38 | 98.7 | 0.82 | 955 | 0.025 | 8.42E+05 |
| 3 | 1 | 3.42 | 2.38 | 151.2 | 1.26 | 1025 | 0.038 | 9.04E+05 |
| 3 | 1 | 3.42 | 2.38 | 110.6 | 0.92 | 1020 | 0.028 | 9.00E+05 |
| 3 | 1 | 3.43 | 2.38 | 88.2 | 0.74 | 1190 | 0.022 | 1.05E+06 |
| 3 | 1 | 3.42 | 2.38 | 112.3 | 0.94 | 982 | 0.028 | 8.66E+05 |
| 3 | 1 | 3.43 | 2.39 | 101.9 | 0.85 | 1249 | 0.026 | 1.10E+06 |
| 3 | 1 | 3.43 | 2.38 | 132.7 | 1.11 | 1389 | 0.034 | 1.23E+06 |
| 3 | 1 | 3.43 | 2.39 | 123.8 | 1.03 | 1092 | 0.031 | 9.63E+05 |
| 3 | 1 | 3.43 | 2.38 | 98.1 | 0.82 | 799 | 0.025 | 7.05E+05 |
| 3 | 1 | 3.42 | 2.38 | 78.7 | 0.66 | 652 | 0.020 | 5.75E+05 |
| 3 | 1 | 3.42 | 2.38 | 99.1 | 0.83 | 565 | 0.025 | 4.98E+05 |
| 3 | 1 | 3.43 | 2.38 | 117.6 | 0.98 | 686 | 0.030 | 6.05E+05 |
| 3 | 1 | 3.43 | 2.38 | 110.5 | 0.92 | 559 | 0.028 | 4.93E+05 |
| 3 | 1 | 3.43 | 2.39 | 121.1 | 1.01 | 639 | 0.031 | 5.64E+05 |

-continued

| Parts Water parts | Parts Solution parts | Mass pure solution g | Mass total solids g | Properties at maximum compressive load | | | | |
|---|---|---|---|---|---|---|---|---|
| | | | | Time sec | Extension mm | Load N | Strain mm/mm | Stress Pa |
| 3 | 1 | 3.43 | 2.38 | 105.8 | 0.88 | 968 | 0.027 | 8.54E+05 |
| 3 | 1 | 3.43 | 2.39 | 103.5 | 0.86 | 910 | 0.026 | 8.02E+05 |
| 3 | 1 | 3.43 | 2.38 | 107.5 | 0.90 | 972 | 0.027 | 8.57E+05 |
| 3 | 1 | 3.42 | 2.38 | 111.4 | 0.93 | 892 | 0.028 | 7.86E+05 |
| 3 | 1 | 3.42 | 2.38 | 119.1 | 0.99 | 925 | 0.030 | 8.15E+05 |
| 3 | 1 | 3.43 | 2.39 | 111.0 | 0.93 | 816 | 0.028 | 7.19E+05 |
| 3 | 1 | 3.43 | 2.38 | 83.3 | 0.69 | 972 | 0.021 | 8.57E+05 |
| 3 | 1 | 3.42 | 2.38 | 106.2 | 0.89 | 926 | 0.027 | 8.17E+05 |
| 3 | 1 | 3.43 | 2.38 | 106.1 | 0.88 | 738 | 0.027 | 6.50E+05 |
| 3 | 1 | 3.43 | 2.38 | 112.3 | 0.94 | 847 | 0.028 | 7.46E+05 |
| 3 | 1 | 3.43 | 2.39 | 113.5 | 0.95 | 824 | 0.029 | 7.27E+05 |
| 3 | 1 | 3.42 | 2.38 | 115.5 | 0.96 | 728 | 0.029 | 6.42E+05 |
| 4 | 1 | 2.74 | 1.90 | 96.3 | 0.80 | 942 | 0.024 | 8.30E+05 |
| 4 | 1 | 2.74 | 1.91 | 81.8 | 0.68 | 685 | 0.021 | 6.04E+05 |
| 4 | 1 | 2.74 | 1.91 | 90.1 | 0.75 | 908 | 0.023 | 8.00E+05 |
| 4 | 1 | 2.74 | 1.91 | 66.4 | 0.55 | 778 | 0.016 | 6.86E+05 |
| 4 | 1 | 2.73 | 1.90 | 101.1 | 0.84 | 850 | 0.026 | 7.49E+05 |
| 4 | 1 | 2.74 | 1.90 | 75.5 | 0.63 | 748 | 0.019 | 6.60E+05 |
| 5 | 1 | 2.28 | 1.59 | 90.3 | 0.75 | 632 | 0.023 | 5.57E+05 |
| 5 | 1 | 2.29 | 1.59 | 86.1 | 0.72 | 714 | 0.022 | 6.29E+05 |
| 5 | 1 | 2.28 | 1.59 | 82.2 | 0.69 | 640 | 0.021 | 5.65E+05 |
| 5 | 1 | 2.28 | 1.59 | 86.3 | 0.72 | 637 | 0.022 | 5.61E+05 |
| 5 | 1 | 2.28 | 1.59 | 95.7 | 0.80 | 599 | 0.024 | 5.29E+05 |
| 5 | 1 | 2.28 | 1.59 | 86.0 | 0.72 | 666 | 0.022 | 5.87E+05 |
| 5 | 1 | 2.29 | 1.59 | 106.1 | 0.88 | 717 | 0.027 | 6.32E+05 |
| 5 | 1 | 2.28 | 1.59 | 106.7 | 0.89 | 611 | 0.027 | 5.39E+05 |
| 5 | 1 | 2.28 | 1.59 | 96.8 | 0.81 | 642 | 0.024 | 5.66E+05 |
| 5 | 1 | 2.28 | 1.59 | 127.7 | 1.06 | 713 | 0.032 | 6.29E+05 |
| 5 | 1 | 2.28 | 1.59 | 129.7 | 1.08 | 661 | 0.033 | 5.83E+05 |
| 5 | 1 | 2.28 | 1.59 | 133.8 | 1.12 | 657 | 0.034 | 5.79E+05 |
| 6 | 1 | 1.96 | 1.36 | 99.3 | 0.83 | 493 | 0.025 | 4.35E+05 |
| 6 | 1 | 1.96 | 1.36 | 87.8 | 0.73 | 539 | 0.022 | 4.75E+05 |
| 6 | 1 | 1.96 | 1.36 | 69.1 | 0.58 | 554 | 0.017 | 4.88E+05 |
| 6 | 1 | 1.96 | 1.36 | 83.7 | 0.70 | 481 | 0.021 | 4.24E+05 |
| 6 | 1 | 1.96 | 1.36 | 74.4 | 0.62 | 570 | 0.019 | 5.03E+05 |
| 6 | 1 | 1.96 | 1.36 | 77.8 | 0.65 | 561 | 0.020 | 4.95E+05 |
| 8 | 1 | 1.52 | 1.06 | 80.7 | 0.67 | 338 | 0.020 | 2.98E+05 |
| 8 | 1 | 1.52 | 1.06 | 87.1 | 0.73 | 344 | 0.022 | 3.03E+05 |
| 8 | 1 | 1.52 | 1.06 | 89.7 | 0.75 | 385 | 0.023 | 3.40E+05 |
| 8 | 1 | 1.52 | 1.06 | 78.0 | 0.65 | 441 | 0.020 | 3.89E+05 |
| 8 | 1 | 1.52 | 1.06 | 82.5 | 0.69 | 418 | 0.021 | 3.69E+05 |
| 8 | 1 | 1.52 | 1.06 | 83.9 | 0.70 | 362 | 0.021 | 3.19E+05 |
| 10 | 1 | 1.25 | 0.87 | 74.6 | 0.62 | 226 | 0.019 | 1.99E+05 |
| 10 | 1 | 1.25 | 0.87 | 65.6 | 0.55 | 387 | 0.017 | 3.42E+05 |
| 10 | 1 | 1.24 | 0.87 | 68.5 | 0.57 | 271 | 0.017 | 2.39E+05 |
| 10 | 1 | 1.25 | 0.87 | 73.0 | 0.61 | 274 | 0.018 | 2.42E+05 |
| 10 | 1 | 1.25 | 0.87 | 74.3 | 0.62 | 236 | 0.019 | 2.08E+05 |
| 10 | 1 | 1.25 | 0.87 | 60.4 | 0.50 | 240 | 0.015 | 2.12E+05 |
| 15 | 1 | 0.86 | 0.60 | 93.0 | 0.78 | 162 | 0.023 | 1.43E+05 |
| 15 | 1 | 0.86 | 0.60 | 59.9 | 0.50 | 223 | 0.015 | 1.96E+05 |
| 15 | 1 | 0.86 | 0.60 | 77.5 | 0.65 | 202 | 0.020 | 1.78E+05 |
| 15 | 1 | 0.86 | 0.60 | 74.1 | 0.62 | 199 | 0.019 | 1.76E+05 |
| 15 | 1 | 0.86 | 0.60 | 62.9 | 0.52 | 164 | 0.016 | 1.44E+05 |
| 15 | 1 | 0.86 | 0.60 | 80.8 | 0.67 | 198 | 0.020 | 1.74E+05 |
| 1 | 0 | 0.00 | 0.00 | 76.6 | 0.64 | 19 | 0.019 | 1.70E+04 |
| 1 | 0 | 0.00 | 0.00 | 52.3 | 0.44 | 16 | 0.013 | 1.39E+04 |
| 1 | 0 | 0.00 | 0.00 | 69.8 | 0.58 | 21 | 0.018 | 1.85E+04 |
| 1 | 0 | 0.00 | 0.00 | 59.5 | 0.50 | 25 | 0.015 | 2.17E+04 |
| 1 | 0 | 0.00 | 0.00 | 98.5 | 0.82 | 18 | 0.025 | 1.56E+04 |
| 1 | 0 | 0.00 | 0.00 | 29.9 | 0.25 | 25 | 0.008 | 2.18E+04 |
| 0 | 1 | 13.70 | 9.53 | 100.2 | 0.84 | 2731 | 0.025 | 2.41E+06 |
| 1 | 10 | 12.45 | 8.66 | 312.9 | 2.61 | 2515 | 0.079 | 2.22E+06 |
| 1 | 5 | 11.41 | 7.94 | 122.8 | 2.05 | 9293 | 0.062 | 8.19E+06 |
| 1 | 3 | 10.28 | 7.15 | 135.2 | 1.13 | 859 | 0.034 | 7.57E+05 |
| 1 | 2 | 9.14 | 6.36 | 122.4 | 1.02 | 1234 | 0.031 | 1.09E+06 |
| 0.7 | 1 | 8.06 | 5.61 | 114.2 | 1.90 | 8625 | 0.058 | 7.61E+06 |
| 1 | 1 | 6.85 | 4.77 | 154.5 | 1.29 | 4307 | 0.039 | 3.80E+06 |
| 1.4 | 1 | 5.71 | 3.97 | 81.2 | 1.35 | 4055 | 0.041 | 3.58E+06 |
| 2 | 1 | 4.57 | 3.18 | 102.1 | 0.85 | 1384 | 0.026 | 1.22E+06 |
| 3 | 1 | 3.43 | 2.38 | 100.9 | 0.83 | 1035 | 0.025 | 9.12E+05 |
| 4 | 1 | 2.74 | 1.91 | 85.2 | 0.71 | 818 | 0.021 | 7.22E+05 |
| 5 | 1 | 2.28 | 1.59 | 102.3 | 0.85 | 657 | 0.026 | 5.80E+05 |
| 6 | 1 | 1.96 | 1.36 | 82.0 | 0.68 | 533 | 0.021 | 4.70E+05 |
| 8 | 1 | 1.52 | 1.06 | 83.7 | 0.70 | 381 | 0.021 | 3.36E+05 |

-continued

| Parts Water parts | Parts Solution parts | Mass pure solution g | Mass total solids g | Properties at maximum compressive load | | | | |
|---|---|---|---|---|---|---|---|---|
| | | | | Time sec | Extension mm | Load N | Strain mm/mm | Stress Pa |
| 10 | 1 | 1.25 | 0.87 | 69.4 | 0.58 | 273 | 0.018 | 2.40E+05 |
| 15 | 1 | 0.86 | 0.60 | 74.7 | 0.62 | 191 | 0.019 | 1.69E+05 |
| 1 | 0 | 0.00 | 0.00 | 64.4 | 0.54 | 21 | 0.016 | 1.81E+04 |

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

The invention claimed is:

1. A method comprising:
   providing an aqueous solution made from:
      from about 65 to about 70 wt % of a sugar;
      from about 9 to about 10 wt % of a water-soluble polysaceharide;
      from about 0.9 to about 1 wt % of a phosphate;
      from about 0.9 to about 1 wt % of a surfactant; and
      from about 18 wt % to remainder of water;
   applying the solution to sand or dust particles; and
   allowing the solution to bind to the sand or dust particles and to dry thereby forming a hardened crust.

2. The method of claim 1, wherein the sugar is selected from solid sugar, syrup, corn syrup, monosaccharides, disaccharides, and combinations thereof.

3. The method of claim 1, wherein the water-soluble polysaccharide is starch.

4. The method of claim 1, wherein the water-soluble polysaccharide is guar gum.

5. The method of claim 1, wherein the phosphate is trisodium phosphate.

6. The method of claim 1, wherein the phosphate is a phosphate-containing detergent.

7. The method of claim 1, wherein the surfactant is selected from soaps, quaternary ammonium salts, and combinations thereof.

8. The method of claim 1, wherein the solution is applied by using a hand held bottle sprayer, a garden sprayer, a pump sprayer, a hydro-seeder, an agricultural sprayer, a fire truck, an aircraft sprayer, or any combination thereof.

9. The method of claim 1, further comprising:
   diluting the composition with water before applying the composition to the sand or dust.

10. A method comprising:
    providing an aqueous solution made from:
       from about 18 to about 70 wt % of a sugar;
       from about 2 to about 10 wt % of a water-soluble polysaccharide;
       from about 0.1 to about 1 wt % of a phosphate-containing detergent;
       from about 0.01 to about 1 wt % of a surfactant; and
       from about 18 wt % to remainder of water;
    applying the solution to sand or dust particles; and
    allowing the solution to bind to the sand or dust particles and to dry thereby forming a hardened crust.

11. The method of claim 10, wherein the sugar is selected from solid sugar, syrup, corn syrup, monosaccharides, disaccharides, and combinations thereof.

12. The method of claim 10, wherein the water-soluble polysaccharide is starch.

13. The method of claim 10, wherein the surfactant is selected from soaps, quaternary ammonium salts, and combinations thereof.

14. The method of claim 10, wherein the solution is applied by using a hand held bottle sprayer, a garden sprayer, a pump sprayer, a hydro-seeder, an agricultural sprayer, a fire truck, an aircraft sprayer, or any combination thereof.

15. The method of claim 10, further comprising:
    diluting the composition with water before applying the composition to the sand or dust.

\* \* \* \* \*